Patented July 18, 1950

2,515,628

UNITED STATES PATENT OFFICE 2,515,628

ALIPHATIC-CYANO-AZO COMPOUNDS

John Edwards Castle, Wilmington, Del., assignor to E. I. du Pont de Nemours & Company, Wilmington, Del., a corporation of Delaware No Drawing. Application March 22, 1947, Serial No. 736,583

8 Claims. (Cl. 260—192)

This invention relates to aliphatic azo compounds and their use in the polymerization of polymerizable organic compounds.

Compounds containing directly-linked oxygen atoms, such as benzoyl and other peroxides, have been widely used as polymerization catalysts. They provide a source of oxygen which may change the properties of the polymer, e. g. by discoloration thereof, oxidation of added dyestuffs, and crosslinking effects.

This invention has as an object the preparation of new aliphatic azo compounds. A further object is the provision of new catalysts for the polymerization of ethylenically unsaturated compounds. Other objects will appear hereinafter.

These objects are accomplished by the invention of azo compounds having attached to the azo nitrogens a saturated aliphatic chain of at least four carbon atoms, the carbon alpha to azo nitrogen in said chain bearing a neutral negative group and the carbon gamma to the azo nitrogen bearing one and only one hydrogen atom.

A further phase of the invention is the use of said azo compounds as catalysts for the polymerization of polymerizable compounds having ethylenic unsaturation, preferably containing the group $CH_2=C<$.

The following examples illustrate the principles involved in the invention. All parts are by weight.

EXAMPLE I

*Preparation of alpha,alpha'-azobis(alpha,-gamma-dimethylvaleronitrile)*

The following solutions, which were cooled to about 10° C., were introduced into a reaction vessel: 21 parts of hydrazine dihydrochloride in 100 parts water, 21 parts sodium cyanide in 10 parts water, 120 parts ethyl alcohol and 40 parts of isobutyl methyl ketone. The vessel was closed and the contents were stirred for four hours at 10° C. and for 16 hours at 20° C. The oil (alpha,alpha'-hydrazobis(alpha,gamma-dimethylvaleronitrile)) which formed was separated and 20 parts of ethyl alcohol added to it. The solution was cooled to 10° C., a mixture of 100 parts water and 106 parts concentrated hydrochloric acid was added at 5° C. and then 20 parts of bromine at 0–5° C. was added dropwise. After excess bromine had been discharged with sodium bisulfite solution, the solid was collected on a filter, dried in air and crystallized from chilled petroleum ether. There was obtained nine parts (18% theory) which melts at about 47° C. Two forms of alpha,alpha'-azobis-(alpha,gamma-dimethylvaleronitrile) are obtained by fractional crystallization from petroleum ether. The less soluble form has a melting point of 78° C. and the following analysis: Calculated, N, 22.6; C, 67.7; H, 9.7. Found, N, 23.4; C, 68.3; H, 10.2. The more soluble isomer melts at 49–51° C. The isomers are equally effective as polymerization catalysts.

When isobutyl methyl ketone cyanhydrin was prepared and reacted with anhydrous hydrazine, the hydrazo compound was obtained in 43% yield as compared to a maximum of about 24% for the yield by the process in the preceding paragraph.

EXAMPLE II

*Preparation of alpha,alpha'-azobis(alpha,-gamma-dimethylcapronitrile)*

Into a reaction vessel were placed 25 parts of 4-methyl-2-hexanone (B. P. 139° C., prepared from acetoacetic ester and sec. butyl bromide) and 5.6 parts of hydrazine hydrate. After refluxing for 6 hours, there was obtained 10 parts of the crude azine by removal of materials boiling below 80° C. at 25 mm. The azine was placed in a pressure-resistant vessel, 28 parts of hydrogen cyanide added, the vessel closed and heated at 75° C. for 4 hours. Excess hydrogen cyanide was removed by evaporation and the crude hydrazonitrile dissolved in a solution containing 12 parts of ethyl alcohol, 50 parts water, and 33 parts concentrated hydrochloric acid. The cooled solution was treated with chlorine until an excess was present. The alpha,alpha'-azobis(alpha,gamma-dimethylcapronitrile) separated as an oil and was solidified by cooling a methyl alcohol solution of the oil. The azo compound, which was obtained in 10% yield, melted at 35–40° C. and had the following analysis: Calculated, N, 20.3; Found, N, 19.6.

EXAMPLE III

*Preparation of alpha,alpha'-azobis(alpha-isobutyl-gamma-methylvaleronitrile)*

Into a reaction vessel were placed 25 parts of diisobutyl ketone, 9.5 parts hydrazine hydrate and 20 parts ethyl alcohol. After refluxing with stirring for 16 hours, there was obtained 23.5 parts of the azine boiling at 164° C./28 mm. After separation, the azine was heated with 42 parts of hydrogen cyanide at 75° C. for 4 hours in a pressure-resistant vessel. Excess hydrogen cyanide was removed by evaporation and the crude hydrazonitrile dissolved in a solution containing 20 parts ethyl alcohol, 75 parts water, and 67 parts concentrated hydrochloric acid. The solution was cooled to 0–5° C. and treated with chlorine until an excess was present. There was obtained 6 parts of alpha,alpha' - azobis(alpha - isobutyl-gamma-methylvaleronitrile) which upon crystallization from diethyl ether melted at 90° C. with decomposition and had the following analysis: Calculated, C, 72.2; H, 10.8. Found, C, 71.8; H, 10.5.

EXAMPLE IV

Use as polymerization catalysts

A pressure-resistant vessel was charged with 20 parts of acrylonitrile, 80 parts of cyclohexane and 0.04 mol per cent of catalyst based on the acrylonitrile. Air was flushed from the vessel with nitrogen and the vessel closed and heated for 4 hours at 50° C. in a water bath. The vessel was then opened and the acrylonitrile polymer separated by filtration. The following table shows the yield of dry polymer and catalysts employed. The first three catalysts are the compounds of Examples I, II, and III, respectively. The last four compounds are similar but do not come under the definition of the azo compounds of this invention.

| Catalyst | Per Cent Conversion |
|---|---|
| alpha, alpha'-Azobis (alpha, gamma-dimethylvaleronitrile) | 85 |
| alpha, alpha'-Azobis (alpha, gamma-dimethylcapronitrile) | 85 |
| alpha, alpha'-Azobis (alpha-isobutyl-gamma-methylvaleronitrile) | 60 |
| alpha, alpha'-Azobis (alpha-n-butylcaprinitrile) | 22 |
| alpha, alpha'-Azobis (alpha-methylcapronitrile) | 17 |
| alpha, alpha'-Azobis (alpha, beta, beta-trimethylbutyronitrile)[1] | 0 |
| alpha, alpha'-Azodiisobutyronitrile | 16 |

[1] This compound is a polymerization catalyst at somewhat higher temperatures, e. g. 60° or higher.

Under equivalent conditions in the polymerization of methyl methacrylate castings (using 250 P. P. M. of catalyst at 130° F.), the polymerization required ten hours with benzoyl peroxide, eight hours with azodiisobutyronitrile, but only four and one-half hours with alpha,alpha'-azobis(alpha,gamma-dimethylvaleronitrile).

The unexpected superiority of speed of polymerization obtained with these catalysts is not restricted to the polymerization of acrylonitrile and methyl methacrylate. Addition polymerizations, including copolymerizations, of polymerizable compounds containing at least one ethylenic double bond are catalyzed with unusual speed by the azo compounds of this invention. These include the polymerizations of styrene, ethylene, tetrafluoroethylene, vinyl and vinylidene halides, e. g., vinyl fluoride and vinylidene chloride, vinyl esters, e. g., vinyl acetate, acrylyl and methacrylyl compounds and compounds containing two or more isolated or conjugated ethylenic double bonds such as the diacrylic acid esters of glycols and polyethylene glycols, e. g. acrylonitrile, methyl acrylate, methacrylamide, tetraethyleneglycol dimethacrylate, diallyl diglycolate, diallyl carbonate, diallyl phthalate, ethylene bis(allyl maleate), butadiene, chloroprene, styrene/maleic anhydride, etc.

The use of the compounds of the present application as polymerization catalysts is disclosed and claimed in my copending application Serial No. 40,619, filed July 24, 1948.

The new azo compounds of this invention are preferably prepared by the process of reacting hydrazine with a ketone of the general formula

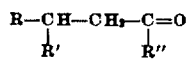

wherein R, R', and R" are lower aliphatic radicals, preferably alkyl radicals of one to four carbons, followed by separation of the azine and subsequent reaction of the azine with hydrogen cyanide to give the hydrazo compound. The hydrazo compound obtained by this reaction is oxidized to the azo compound suitably by bromine or chlorine. The azo compounds thus obtained may be represented by the formula

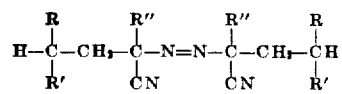

wherein R, R' and R" are preferably alkyl radicals of one to four carbons, e. g., methyl, ethyl, propyl, butyl.

The cyano compounds of this invention are also useful as intermediates in the preparation of the corresponding dinitriles by decomposition by heat.

Compounds of the above general type but which have the cyano group replaced by carbalkoxy, e. g. carbethoxy, or carbonamide, can be prepared from the nitrile by treatment with methanolic hydrogen chloride followed by reaction with an alcohol or ammonia. The cyano, carbalkoxy and carbonamide groups are negative groups but are neutral with respect to acidity. These compounds are also useful as catalysts for vinyl polymerization.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Alpha,alpha'-azobis(alpha,gamma - dimethylvaleronitrile).

2. An azo compound having a saturated aliphatic chain of at least four carbons attached to each azo nitrogen, the carbon alpha to azo nitrogen in each chain bearing a cyano group and the carbon gamma to the azo nitrogen in each chain bearing one and only one hydrogen atom the carbons attached both to azo nitrogen and cyano carbon being tertiary.

3. An azo compound having a saturated aliphatic chain of at least four carbons attached to each azo nitrogen, the carbon alpha to azo nitrogen in each chain bearing a neutral negative group and the carbon gamma to the azo nitrogen in each chain bearing one and only one hydrogen atom the carbons attached both to azo nitrogen and the neutral negative group being tertiary.

4. An azo compound having attached to each azo nitrogen a saturated aliphatic chain of at least four carbons whereof the carbon alpha to azo nitrogen bears a cyano group and the carbon gamma to azo nitrogen bears one hydrogen and two alkyl groups of one to four carbons the carbons attached both to azo nitrogen and cyano carbon being tertiary.

5. An azo compound having, attached to each azo nitrogen, an alpha cyanoalkyl radical having but one hydrogen on the gamma carbon and having a chain of at least four carbons the carbons attached both to azo nitrogen and cyano carbon being tertiary.

6. An azo compound having, attached to each azo nitrogen, an alpha cyanoalkyl radical having a chain of at least four carbons and having on the gamma carbon one hydrogen and two alkyl groups of one to four carbons the carbons attached both to azo nitrogen and cyano carbon being tertiary.

7. An azo compound having attached to each azo nitrogen a chain of at least four carbons in a radical which is alkyl except for a neutral negative radical on the alpha carbon and which has but one hydrogen on the gamma carbon the carbons attached both to azo nitrogen and the neutral negative group being tertiary.

8. An azo compound of the formula

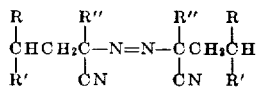

wherein R, R', and R'' are alkyl radicals of one to four carbons.

JOHN EDWARDS CASTLE.

REFERENCES CITED

The following references are of record in the file of this patent:

UNITED STATES PATENTS

| Number | Name | Date |
|---|---|---|
| 1,980,483 | Hill | Nov. 13, 1934 |
| 2,193,676 | Muth | Mar. 12, 1940 |
| 2,471,959 | Hunt | May 31, 1949 |

OTHER REFERENCES

Beilstein, Handbuch der Organischen Chemie, Ed. 4 (1922), vol. 4, p. 563. Vol. 4, 1st supplement, p. 566.

Thiele, Liebig's Annalen, 290, 14 (1896).

Dox, J. Am. Chem. Soc. 47, 1471-5 (1925).